No. 635,702. Patented Oct. 24, 1899.
C. P. STEMBEL.
RAILWAY CASH FARE TICKET.
(Application filed Apr. 2, 1898.)
(No Model.) 2 Sheets—Sheet 1.
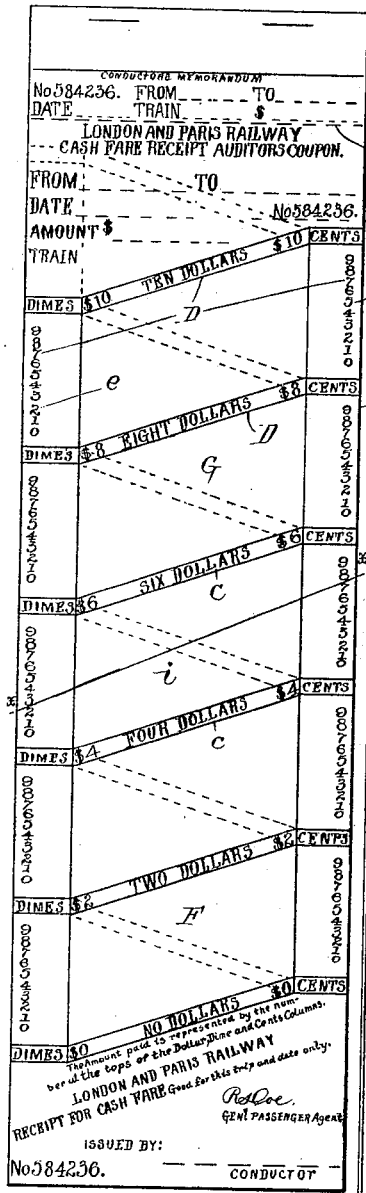
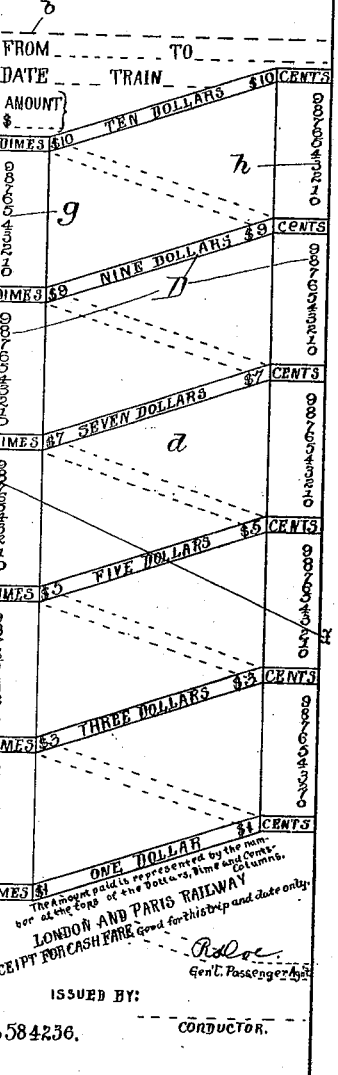
Fig. 1. Fig. 2. Fig. 4. Fig. 3.
Witnesses:
John E. Styker
W. Barsley
Inventor:
Clarence P. Stembel.
per: F. D. Bradbury
Attorney.
THE NORRIS PETERS CO., PHOTO-LITHO., WASHINGTON, D. C.

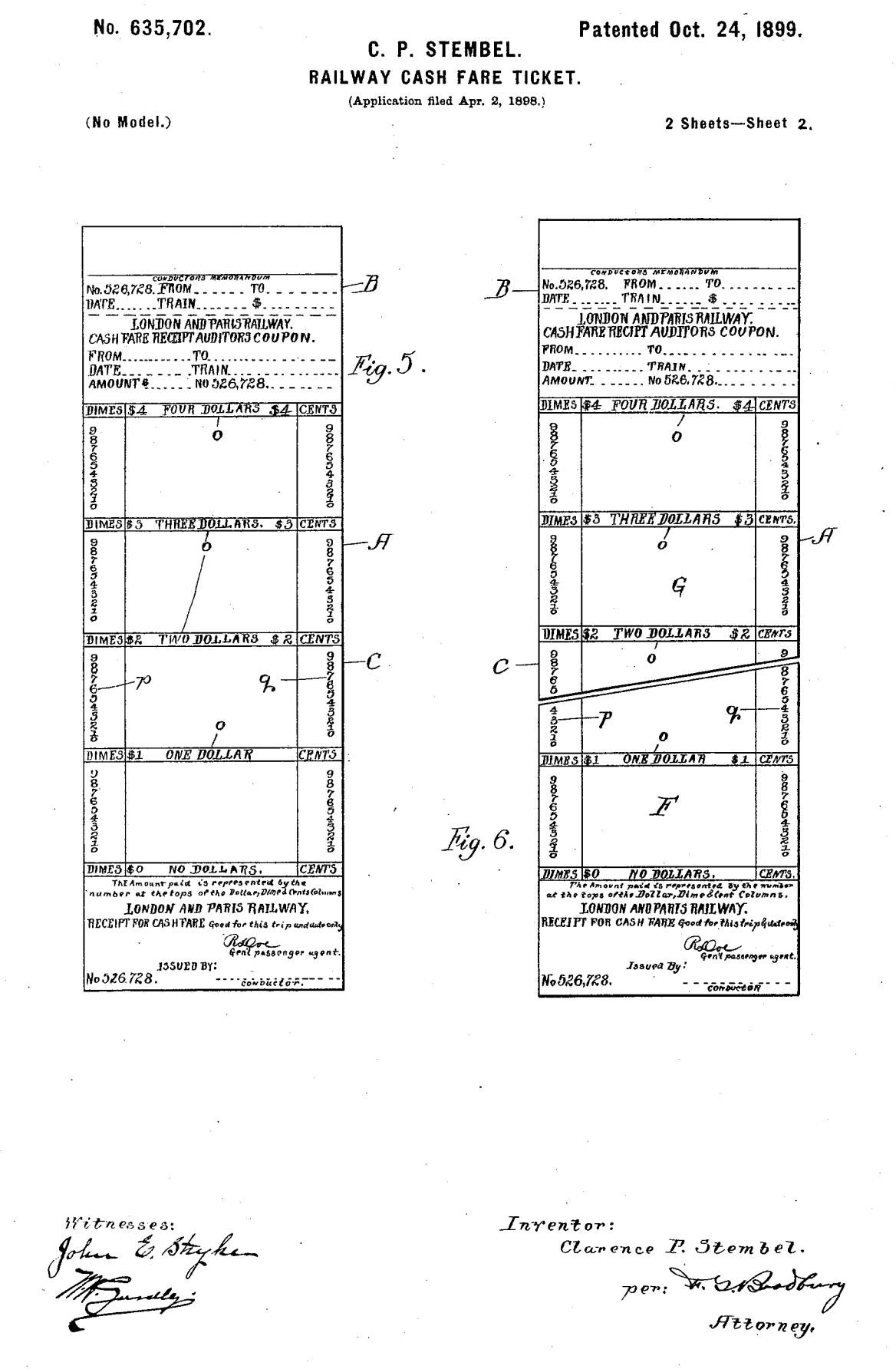

No. 635,702. Patented Oct. 24, 1899.
C. P. STEMBEL.
RAILWAY CASH FARE TICKET.
(Application filed Apr. 2, 1898.)

(No Model.) 2 Sheets—Sheet 2.

*Fig. 5.*

*Fig. 6.*

Witnesses:
John E. Stryker

Inventor:
Clarence P. Stembel.
per: Attorney.

UNITED STATES PATENT OFFICE.

CLARENCE P. STEMBEL, OF ST. PAUL, MINNESOTA.

RAILWAY CASH-FARE TICKET.

SPECIFICATION forming part of Letters Patent No. 635,702, dated October 24, 1899.

Application filed April 2, 1898. Serial No. 676,173. (No model.)

*To all whom it may concern:*

Be it known that I, CLARENCE P. STEMBEL, of St. Paul, Ramsey county, Minnesota, have invented certain Improvements in Railway Cash-Fare Tickets, of which the following is a specification.

The object of my invention is to prevent conductors from defrauding either railway companies or passengers in receiving and accounting for way-fares and at the same time to produce a simple and convenient ticket.

The tickets are intended to be bound into books with perforated ends or stubs, which remain in the binding for the conductor's memoranda. By printing each leaf or ticket on both face and back the amount which may be registered in any given transaction is doubled without unduly increasing the dimensions of the ticket. The amounts in dollars are printed diagonally across the face and back of the leaf, the odd numbers being on one and the even on the other. Between the dollar-diagonals the numerals from "0" to "9" are printed in columns, one column indicating dimes and one cents. By means of a single straight tear it is then possible for the conductor to deliver to a passenger a receipt for the exact amount paid and at the same time retain a voucher for the transaction. It is not possible to increase the amount indicated on the portion handed to the passenger nor to decrease the amount registered upon the portion retained.

I am aware that other tickets are in use wherein an amount is indicated or cancellation is accomplished by means of cutting or tearing the ticket; but my ticket differs from all of these in that the registration of an amount and cancellation are secured by a single straight tear or cut.

In the accompanying drawings, forming a part of this specification, Figure 1 shows one side of the ticket removed from the binding. Fig. 2 shows the other side of the same. Fig. 3 is an edge view of the booklet. Fig. 4 is a detail view of the back of the booklet, showing a metal straight edge fastened thereto for convenience in tearing the ticket. Figs. 5 and 6 are respective views of alternate construction of ticket to be used where only a small amount of money is received and when consequently the ticket is not too long for convenience in holding.

In the drawings each leaf A is bound into the cover $a$ of the book and is composed of the stub B and ticket portion C, made detachable by means of the perforations $b$. The stub has suitable spaces, on which, it is obvious, any desired data may be entered.

The ticket C is divided into the diagonal scale D, indicating dollars, dimes, and cents. I prefer to have the even-dollar marks $c$ upon one side of the ticket and the odd-dollar marks $d$ relatively opposite on the other side. In parallel marginal columns on either edge of the ticket, both on its face and back, are the dime and cent numerals $e$ and $f$ and $g$ and $h$, respectively. These numerals begin with "0" at the dollar-line and run consecutively upward to "9," where another dollar-line is reached, and the same consecutive rotation is repeated until the end of the column is reached. The similar dime and cent numerals are thus substantially opposite in marginal rows and, with the dollar-numerals, form the diagonal scale.

Referring to Fig. 1, it will be seen that the cut intersects the diagonal scale in the four-dollar space $i$, the dime-column $e$ between numerals "2" and "3," and the cent-column $f$ between the numerals "7" and "8."

If an odd number of dollars is received, the opposite side of the ticket is used in a similar manner to that of the even. While I have shown a ticket for the amount of ten dollars only, it is obvious that the amount for which such a ticket can be designated is unlimited.

Each of the parts F and G of the ticket A has stamped thereon its number and suitable identification data, and spaces are left on either face of the ticket for use by the conductors, and it is obvious that he may there insert any data that is required by the respective railway companies.

For convenience in using my improved ticket I provide a straight-edge E, made of metal or other suitable material, having tearing edge $j$ and fasten the same to the cover $a$ by means of clips $k$. The end $l$ is left free and allows the ticket to be adjusted thereunder in any desired position for cutting on line X X, thus severing the portion F, which is handed to the passenger. The amount shown as received is "$4.27," and the conductor's coupon G reads upward therefrom. The opposite side of the ticket shows the cut intersecting the dollar-mark, thus canceling that side and rendering it useless. To keep the straight-edge from catching in the clothing, &c., I bend its end l, thus forming a clip m, the end n of which engages with the cover a when the clip is sprung back.

In the alternate construction shown in Figs. 5 and 6 the dollar-marks o are shown on the face of the ticket in bands transverse to the marginal columns of dimes and cents p and q, respectively.

The ticket C in Fig. 6 is shown torn for "$1.48," the tear being performed in a single operation, as before described. It is thus evident that, the amount being small, it does not necessitate printing a portion of the ticket on the back of same.

Having described my invention, what I claim as new, and desire to protect by Letters Patent, is—

1. A ticket of the class described, the dollar-marks appearing diagonally across the face of the ticket, the dimes and cents appearing in marginal columns along the edges thereof, adapted so as with a single tear of the ticket to indicate any amount, from one cent to ten dollars, more or less, upon one portion of the ticket, and record the amount upon the remaining portion of said ticket, substantially as described.

2. Upon a railroad-ticket of the class described, the combination of a succession of diagonal lines or bands, upon which amounts in dollars are indicated by letters or figures, or both, across the front and back thereof, with columns of figures along the side margins of the ticket to indicate dimes and cents for the purpose of registering a fare and canceling the ticket, by means of a single and substantially straight tear, as described.

3. A railroad-ticket of the class described, with horizontal or diagonal dollar-bands across its face and back and numerals from "0" to "9," both inclusive arranged vertically along each edge of the ticket and between each couplet or pair of bands to indicate dimes and cents, whereby any desired amount within the limits indicated upon the ticket may be designated, by a single and substantially straight tear.

4. A railway-ticket book consisting of a number of detachable tickets each fastened into the cover of the book, in combination with the straight-edge E, consisting of a strip of metal or other suitable material, fastened to the cover, one end of which is free and bent about the edge of the cover so as to form a clip which engages the cover for the purposes specified.

5. A ticket of the class described, divided into a diagonal scale, having dollar-bands across its face and back and dime and cent marks arranged in marginal columns and interspaced between in relatively opposite positions on the face and back thereof, adapted by means of a single straight tear or cut to register a fare upon one side or face of the ticket and cancel the remaining portion, substantially as described.

6. A ticket of the class described, having successive sums of money marked thereon arranged with dollar-bands across its face and dimes and cents interspaced between in marginal columns from "0" to "9" both inclusive whereby a single cut or tear will indicate any amount in dollars and cents within the limits and simultaneously cancel the ticket, substantially as described.

7. In a ticket of the class described an even and uneven dollar diagonal scale appearing respectively across the face and back of the ticket, having a dime and cent scale respectively interspaced between in marginal columns from "0" to "9" inclusive, arranged so that a single tear registers the exact amount of the fare within the limits of the ticket and cancels the ticket, substantially as described.

8. A ticket of the class described, divided into even and uneven diagonal scales indicating dollars, dimes and cents arranged on either side or face thereof at opposite angles whereby a single cut or tear will apportion the ticket for registering a fare within the limits thereof and simultaneously cancel the ticket.

9. A ticket of the class described, divided into a dollar, dime and cent scale, having the dollar-marks indicated by horizontal or diagonal bands and the dimes and cents by numerals from "0" to "9" both inclusive, arranged in marginal columns, substantially as described.

10. The combination with the ticket-book of a flexible straight-edge E, rigidly fastened at one end to the cover of the book and its free end bent about the edge of the cover so as to form a clip which engages the cover, for the purposes specified.

11. A ticket having dollar-bands, c and d arranged across the face and back thereof, and dime and cent marks e and f and g and h from "0" to "9" both inclusive, interspaced between, composed of separate columns arranged angularly to said dollar-bands whereby a single cut or tear registers a fare upon and cancels the remaining portion of the ticket.

12. The combination in a ticket-book of the class described, of a number of detachable tickets, each fastened into the cover of the book and a straight-edge, consisting of a strip of metal or other suitable material, having one end secured to said cover and its opposite end free and bent about the edge of the cover so as to form a clip which engages the cover, thereby adapting said straight-edge to apportion or tear the tickets, substantially as described.

CLARENCE P. STEMBEL.

Witnesses:
F. G. BRADBURY,
W. H. GARDLEY.